April 24, 1956  O. E. JOHNSON  2,742,842
TRACTOR-MOUNTED PLOW
Filed April 12, 1952  3 Sheets-Sheet 1

Inventor:
Otto E. Johnson
Paul O. Pippel
Atty.

April 24, 1956     O. E. JOHNSON     2,742,842
TRACTOR-MOUNTED PLOW

Filed April 12, 1952     3 Sheets-Sheet 2

Inventor:
Otto E. Johnson
Paul O. Pippel
Atty.

April 24, 1956 O. E. JOHNSON 2,742,842
TRACTOR-MOUNTED PLOW
Filed April 12, 1952 3 Sheets-Sheet 3

Inventor:
Otto E. Johnson
Paul O. Pippel
Atty.

United States Patent Office 2,742,842
Patented Apr. 24, 1956

2,742,842

TRACTOR-MOUNTED PLOW

Otto E. Johnson, Canton, Ill., assignor to International Harvester Company, a corporation of New Jersey Application April 12, 1952, Serial No. 281,994

7 Claims. (Cl. 97—47.82)

This invention relates to agricultural implements and particularly to plows. More specifically the invention concerns a tractor-mounted plow.

The invention is particularly applicable to an implement which is mounted upon the rear of a tractor by the type of linkage utilized in the so-called 3-point system, wherein the implement is connected to the tractor by a pair of laterally spaced lower links and by an upper link which is centrally disposed with respect to the two lower links. The implement is usually provided with an upright standard to which the rear end of the upper link is connected.

An object of the invention is to provide an implement attachment for a tractor including a tool-supporting frame and a hitch mechanism for attaching the tool frame to the tractor wherein means are provided accommodating resiliently opposed relative movement between the implement and tractor.

Another object of the invention is to provide in an implement attachment for a tractor, means incorporated in the implement for offsetting the effect of excess draft on the implement.

Another object of the invention is to provide in a tractor-mounted implement such as a plow wherein a cushioned hitch structure is employed, means incorporated in the plow structure when an obstruction is encountered to cause the plow to cut a narrower swath in the ground until the obstruction is passed when a normal width of cut is resumed.

Another object of the invention is to provide in a tractor-propelled plow a cushion spring hitch therefor including laterally spaced springs connected between the tool support and the tractor to yieldingly accommodate relative longitudinal movement between the implement and tractor, wherein one of the springs is under less tension than the other to accommodate lateral swinging of the tool support about a vertical axis to overcome the effects of excessive draft on the implement.

Other objects and advantages of the invention will become clear from the following detailed description when read in conjunction with the accompanying drawings wherein:

Figure 4 is a diagrammatic showing in rear elevation of a plow bottom and its relationship to the previously cut furrow.

Figure 1:
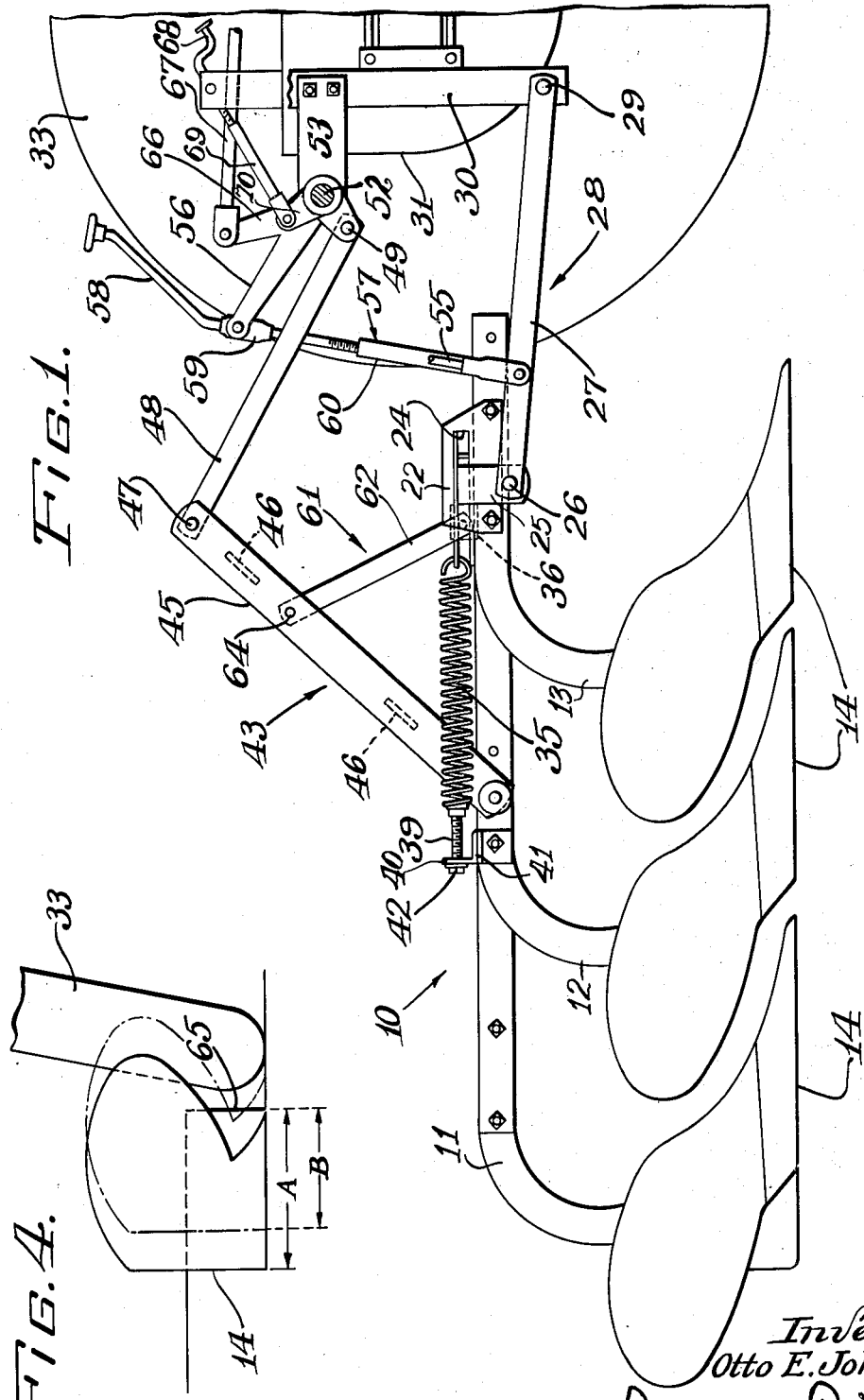
Figure 1 is a view in side elevation and partly in section of the rear end of a tractor having mounted thereupon an implement incorporating the features of this invention and with parts removed for clarity.

Referring now to the drawings, it will be observed that the implement with which this invention is concerned is a 3-bottom plow designated generally by the numeral 10 and comprises a tool frame formed by three laterally spaced longitudinally extending offset tool beams 11, 12 and 13 each of which is curved downwardly at its rear end and supports a moldboard plow bottom 14.

Plow beams 11 and 12 are connected by diagonal cross braces 15 and 16 and plow beams 12 and 13 are connected by braces 17 and 18. Brace 18 extends transversely to the direction of travel and is connected by a transverse bar 19 with an angle bar 20 secured to the beam 12 and to a bar 21 secured to and extending forwardly from the beam 11.

Figure 2:
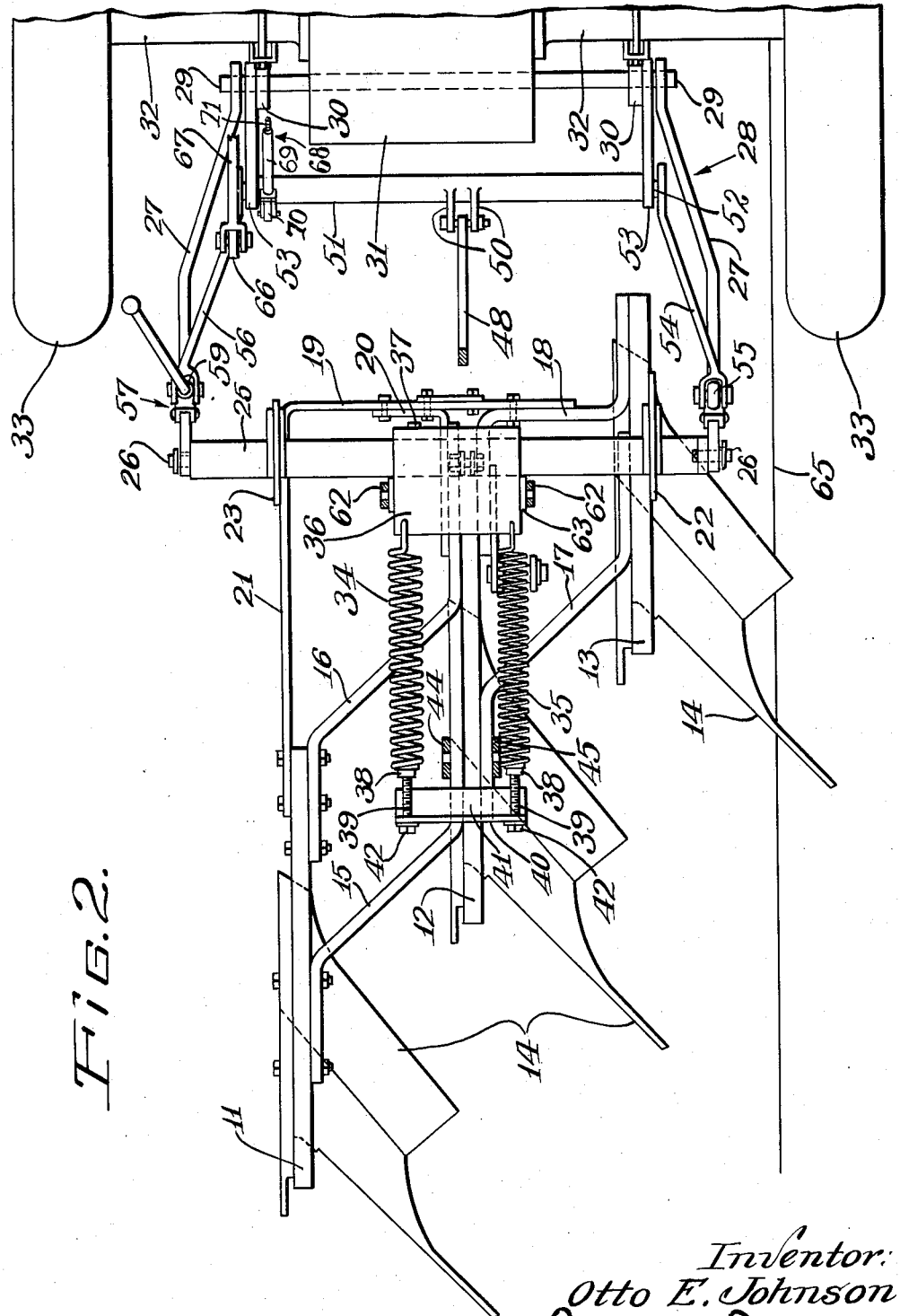
Figure 2 is a plan view, partly in section, of the structure shown in Figure 1.

Beam 13 and bar 21 have secured respectively thereto upstanding plates 22 and 23, each of which is provided with an elongated slot 24 adapted to receive for guided sliding movement a transverse draft bar 25, rectangular in cross-section, and forming lost-motion connections between the tool frame and the draft bar. The right hand end of the bar 25, as viewed in Figure 2, is bent downwardly, as shown clearly in Figure 1, and is provided with a pivot pin 26. A similar pin 26 is provided at the left hand end of the bar 25.

Upon the pivot pins 26 are loosely pivotally mounted the rear ends of forwardly converging links 27 forming a part of a hitch structure generally designated by the numeral 28. The forward ends of the links 27 are loosely pivotally mounted upon the ends of a transversely extending shaft 29 mounted in the lower ends of upright members 30, one of which is provided at each side of the tractor body 31 and is secured to the rear axle housing 32 at each side of the tractor. The housings 32 support axles carrying the drive wheels 33 of the tractor. At this point it should be clear that by virtue of the loose pivotal connections at 26 and 29 of the implement to the tractor, the implement is capable of lateral and vertical swinging movement relative to the tractor.

The implement is also capable, as pointed out before, of longitudinal movement relative to the tractor within the limits provided by the lost-motion connections in the form of slots 24 in the plates 22 and 23. It will also be observed that by virtue of the loose connections referred to the hitch structure 28 is capable of limited lateral swinging, and that the tool-supporting structure of the implement is capable of lateral swinging within the confines of these slots 24 provided in the plates 22 and 23 and about a vertical axis adjacent one of said slots. Longitudinal movement of the tool-supporting structure relative to the hitch and the tractor is provided for the purpose of avoiding damage to the implement when obstructions or abnormal soil conditions are encountered, and this relative longitudinal movement is resisted by cushioning mechanism comprising laterally spaced springs 34 and 35. The forward end of each of the springs 34 and 35 is connected to a U-shaped plate 36 which straddles the draft bar 25 and whose bight portion is secured to the draft bar by one or more bolts 37. The rear ends of the springs 34 and 35 have secured thereto internally threaded members 38 adapted to receive the threaded ends of bolts 39, the shanks of which are slidably received in the upstanding flange 40 of an angle bar 41 affixed to the tool beam 12 centrally of the implement. Nuts 42 are provided at the ends of the bolts 39 by which the tension upon the springs 34 and 35 may be adjusted.

It should now be clear that longitudinal movement of the tool-supporting structure relative to the hitch frame 28 and with respect to the tractor is yieldably resisted by the springs 34 and 35. It should also be observed that under normal plowing conditions substantially no flexing of the springs 34 and 35 occurs and the rectangular draft bar 25 is held by the springs against the rear ends of the slots 24 in the plates 22 and 23. When an obstruction or abnormal soil conditions are encountered, the tool-supporting structure is capable of yielding rearwardly.

The tool-supporting structure is stabilized against lateral tilting about a longitudinal axis by virtue of the fact that the plates 22 and 23 engage the draft bar 25 at laterally spaced locations. Further stabilization of the implement against tilting about a transverse axis is provided by additional hitch mechanism including a standard 43 comprising laterally spaced members 44 and 45 which extend upwardly and forwardly and are connected by one or more cross braces 46. The upper ends of the members 44 and 45 are connected by a pivot pin 47 upon which is mounted the rear end of a forwardly and downwardly extending link 48, pivotally connected at its forward end to a pin 49 mounted between a pair of ears 50 affixed to a sleeve member 51 rockably mounted on a rock shaft 52. The ends of shaft 52 are rotatably received in openings provided in brackets 53, which are secured to upright members 30. To the right hand end of shaft 52 is secured a lift arm 54 which extends rearwardly therefrom and is loosely connected by a link 55 with the right hand link 27. To the left hand end of the rock shaft 52 is secured a lift arm 56 which is loosely connected by an adjustable telescoping link 57 to the left hand link 27. For purposes of levelling the implement, the lift link 57 may be adjusted by means of a crank 58 which is rotatably received in a swivel 59 carried at the end of the arm 56 and is threaded for reception in a sleeve 60 connected to link 27.

A tension member 61 is provided and comprises laterally spaced straps 62 secured at their lower ends to lugs 63 affixed to the U-shaped plate member 36 at the sides thereof. The straps 62 extend upwardly and rearwardly and are pivotally mounted on a pin 64 mounted between the members 44 and 45. This member 61 reacts between the hitch structure and the tool-carrying structure to stabilize the tool support upon rearward movement thereof in response to excessive draft.

Figure 3:
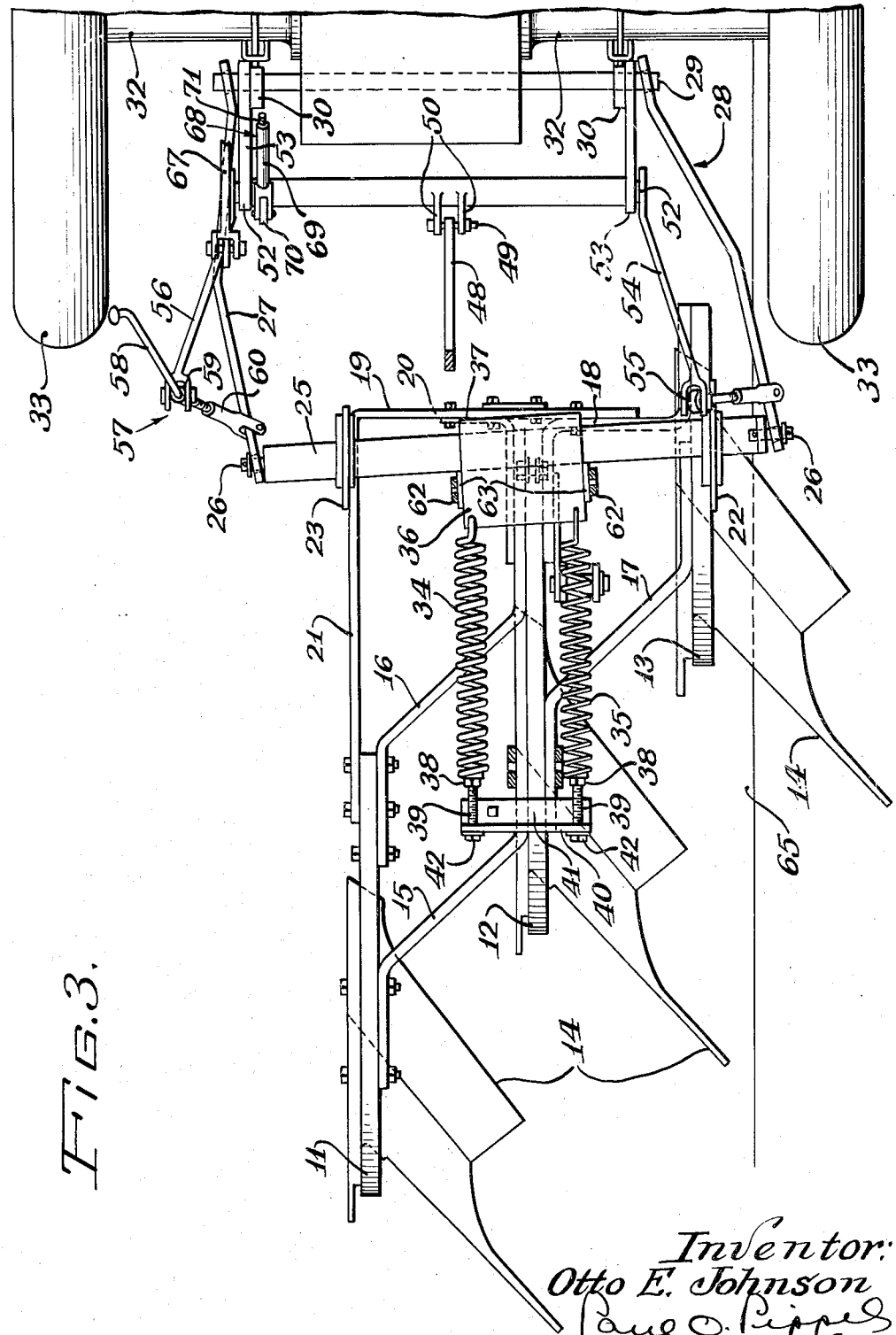
Figure 3 is a plan view similar to Figure 2 but showing the effect of excessive draft in laterally angling the tool suport with respect to its hitch structure.

In order to lighten the load upon the implement when obstructions or hard ground are encountered causing excessive draft on the tool, applicant has provided that the spring 35, while strong enough under normal operating conditions to cooperate with spring 34 in centering the plow, is made somewhat lighter than the left hand spring 34. This permits the plow, when excessive draft is encountered, to follow the line of least resistance and to swing laterally as shown in Figure 3 with respect to the draft bar 25 and the tractor, so that the plow bottoms will point in a direction to make a narrower cut in the soil. Since the landside of the plow bottom 14 bears against the furrow wall, the result of abnormal draft forces is first to cause hitch structure 28 to swing to the right, and the tool carrying frame likewise angles to the right momentarily until the position of Figure 3 is reached, whereupon the tool frame straightens. This position is maintained until normal draft conditions are again encountered and the implement returns to the position of Figure 2. In Figures 2 and 3 the previous furrow wall is represented by a line designated by the numeral 65 and in Figure 3 it will be observed that the plow bottoms have angled to the right in a direction to narrow the cut of the soil and consequently to lighten the load upon the implement. This action of the tool-supporting structure is also indicated diagrammatically in Figure 4, where the normal width of cut of the plow bottom is designated by the letter "A" and the narrowed cut is indicated in dotted lines and designated by the letter "B." If desired, of course, instead of providing that the spring 35 be of lighter construction than the spring 34 the tension thereon may be varied by manipulating the nut 42.

Raising and lowering of the plow is accomplished by mechanism including a lug 66 projecting upwardly from and secured to the lift arm 56 and having connected thereto the rear end of a rod 67 which extends forwardly and is connected to suitable power transmission mechanism, not shown, mounted on the tractor and deriving power therefrom for moving the rod 67 forwardly and rearwardly to rock the shaft 52 and therefore the lift arms 54 and 56 for moving the implement between operating and transport positions.

The sleeve 51 is held against rotation in normal operation by an adjustable member 68, comprising a threaded sleeve 69, pivotally connected to an arm 70 affixed to sleeve 51, and a crank 71 mounted at the upper end of the left hand upright 30 and having a threaded shank receivable in the sleeve portion 69. This adjustable crank member also functions to adjust the operating depth of the implement by rocking the sleeve 51 and lugs 50 to move link 48 forwardly or rearwardly, thus pitching the plow bottoms upwardly or downwardly in a manner well known in the art.

It is believed that the operation of the implement attachment of this invention will be clearly understood from the foregoing description. It should likewise be understood, however, that modifications may be made in the invention without departing from the spirit thereof or the scope of the appended claims.

What is claimed is:

1. In an implement attachment for a tractor to be mounted at the rear thereof, a hitch structure attached to the tractor and extending rearwardly therefrom including a transverse draft member, an earth working tool connected to said member in draft receiving relation comprising a tool-supporting frame, means connecting the latter to said draft member at laterally spaced locations to prevent tilting of the tool about a longitudinal axis, said connecting means including slide and guide means providing for limited lateral swinging movement of the tool relative to the draft member and laterally spaced spring means connecting the draft member to the tool and yieldably resisting relative movement of the tool and draft member, said spring means being differentially tensioned to facilitate lateral swinging of the tool relative to said draft member in one direction in response to excessive draft thereon.

2. In an implement attachment for a tractor to be mounted at the rear thereof, a hitch structure attached to the tractor and extending rearwardly therefrom including a transverse draft member, an earth working tool connected to said member in draft receiving relation comprising a tool supporting frame, means connecting the latter to said draft member at laterally spaced locations to prevent tilting of the tool about a longitudinal axis, said connecting means including laterally spaced springs attached to the tool and to said draft member to yieldably resist relative longitudinal movement between the member and the tool in response to excess draft on the tool, and stop means acting between the member and the tool to limit the relative movement thereof, said stop accommodating limited lateral swinging of the tool relative to said draft member in response to excess draft on the tool, and said springs being differentially tensioned to facilitate lateral swinging of the tool in one direction relative to the draft member.

3. In an implement attachment for a tractor to be mounted at the rear thereof, a hitch structure attached to the tractor for vertical swinging movement relative thereto and extending rearwardly therefrom including a transverse draft bar, an earth working tool connected to said hitch structure in draft receiving relation comprising laterally spaced longitudinally extending tool-supporting beams, closed longitudinally extending slots formed in said beams to slidably receive said bar and accommodate limited longitudinal movement of the tool and lateral swinging thereof about a vertical axis relative to the bar and to the tractor, laterally spaced springs connecting the tool to said bar to hold the latter against the rear ends of said slots and keep the tool centered in normal operation thereof, one of said springs being stronger than the other to facilitate lateral swinging of the tool relative to the hitch structure in response to abnormal draft forces acting upon the tool.

4. In an implement attachment for a tractor to be mounted at the rear thereof, a hitch structure including a pair of laterally spaced lower links pivotally connected at their forward ends to the tractor and supporting at their rear ends a transverse draft member, an upper link pivotally connected at its foward end to the tractor, an earth working tool comprising a tool-supporting frame, slide and guide means connecting the tool frame to said draft member to provide for longitudinal movement of the tool frame in a substantially straight line relative to the draft member and lateral swinging thereof about a vertical axis, a standard mounted on the tool frame pivotally connected to said upper link to resist tilting of the tool frame about a transverse axis, and springs connecting the tool frame to the draft member to yieldably resist relative movement therebetween, said springs being so positioned and arranged as to promote lateral swinging of the tool frame in one direction in response to abnormal draft in a substantially straight line thereon.

5. In an implement attachment for a tractor to be mounted at the rear thereof, a hitch structure including a pair of laterally spaced lower links pivotally connected at their forward ends to the tractor and supporting at their rear ends a transverse draft member, an upper link pivotally connected at its forward end to the tractor, an earth working tool comprising a tool-supporting frame, slide and guide means connecting the tool frame to said draft member to provide for longitudinal movement of the tool frame relative to the draft member and lateral swinging thereof about a vertical axis, laterally spaced springs arranged on opposite sides of a longitudinal center line through said draft member to yieldably resist said relative longitudinal and lateral movement of the tool frame, one of said springs being under greater tension than the other to promote lateral swinging of the tool frame about said vertical axis in one direction in response to abnormal draft on the tool frame during operation.

6. In an implement attachment for a tractor to be mounted at the rear thereof, a hitch structure including a pair of laterally spaced lower links pivotally connected at their forward ends to the tractor and supporting at their rear ends a transverse draft member, an upper link pivotally connected at its forward end to the tractor, an earth working tool comprising a tool-supporting frame, slide and guide means connecting the tool frame to said draft member to provide for longitudinal movement of the tool frame relative to the draft member and lateral swinging thereof about a vertical axis, laterally spaced springs arranged on opposite sides of a longitudinal center line through said draft member to yieldably resist said relative longitudinal and lateral movement of the tool frame, one of said springs being under greater tension than the other to promote lateral swinging of the tool frame about said vertical axis in one direction in response to abnormal draft on the tool frame during operation, and a standard mounted on the tool frame and pivotally connected to said upper link to resist forces tending to tilt the tool frame about a transverse axis.

7. In an implement attachment for a tractor to be mounted at the rear thereof, a hitch structure attached to the tractor and extending rearwardly therefrom including a transverse draft member, an earth working tool connected to said member in draft-receiving relation comprising a tool-supporting frame, laterally spaced lost-motion means connecting the tool frame to said transverse draft member to accommodate limited longitudinal movement of the tool frame relative to said member, and laterally spaced spring means connecting the frame to the draft member operative to hold the tool frame centered with respect to the tractor in normal operation, said spring means being differentially tensioned to accommodate lateral swinging of the tool frame about a vertical axis adjacent one of said lost-motion connections.

References Cited in the file of this patent
UNITED STATES PATENTS

| | | |
|---|---|---|
| 2,230,766 | Smith | Feb. 4, 1941 |
| 2,383,698 | Young | Aug. 28, 1945 |
| 2,551,451 | Morkoski | May 1, 1951 |

FOREIGN PATENTS

| | | |
|---|---|---|
| 940,739 | France | June 7, 1948 |